United States Patent
Fuchino (10) Patent No.: US 8,405,934 B2
(45) Date of Patent: Mar. 26, 2013

(54) ELECTRONIC APPARATUS AND DISK DRIVE SUSPENSION

(75) Inventor: Hideki Fuchino, Aiko-gun (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 191 days.

(21) Appl. No.: 13/075,323

(22) Filed: Mar. 30, 2011

(65) Prior Publication Data

US 2011/0242708 A1 Oct. 6, 2011

(30) Foreign Application Priority Data

Mar. 31, 2010 (JP) .................................. 2010-083945

(51) Int. Cl.
*G11B 21/21* (2006.01)
*G11B 5/58* (2006.01)
(52) U.S. Cl. .................................................. 360/294.4
(58) Field of Classification Search ............... 360/294.4, 360/244.5
See application file for complete search history.

(56) References Cited

U.S. PATENT DOCUMENTS

| 5,320,272 | A  | * | 6/1994  | Melton et al. ............ 228/180.21 |
| 5,773,889 | A  | * | 6/1998  | Love et al. .................... 257/737 |
| 7,872,344 | B2 | * | 1/2011  | Fjelstad et al. ................ 257/690 |
| 8,174,797 | B2 | * | 5/2012  | Iriuchijima ................ 360/294.4 |
| 8,199,441 | B2 | * | 6/2012  | Nojima ........................ 360/294.4 |
| 8,228,642 | B1 | * | 7/2012  | Hahn et al. .................. 360/294.4 |
| 8,248,731 | B2 | * | 8/2012  | Fuchino ..................... 360/245.8 |
| 8,248,734 | B2 | * | 8/2012  | Fuchino ..................... 360/294.4 |
| 8,248,735 | B2 | * | 8/2012  | Fujimoto et al. ........... 360/294.4 |
| 8,248,736 | B2 | * | 8/2012  | Hanya et al. ............... 360/294.4 |
| 2007/0227769 | A1 | * | 10/2007 | Brodsky et al. ............... 174/264 |

FOREIGN PATENT DOCUMENTS

| JP | 2001-307442 A | 11/2001 |
| JP | 2002-50140 A  | 2/2002  |

* cited by examiner

*Primary Examiner* — Angel A. Castro
(74) *Attorney, Agent, or Firm* — Holtz, Holtz, Goodman & Chick, P.C.

(57) ABSTRACT

A microactuator element as an example of an electrical component is disposed on a metallic, electrically conductive plate member. A conductive resin member is disposed on a current-carrying part of the conductive plate member and a conduction part of the microactuator element. A thin porous plating layer of thickness 100 nm or less includes a large number of gold particles is formed in a region of a surface of the conductive plate member which covers the current-carrying part. The conductive resin member is secured to the conductive plate member through the thin porous gold plating layer and electrically connected to the conductive plate member.

8 Claims, 5 Drawing Sheets

ELECTRONIC APPARATUS AND DISK DRIVE SUSPENSION

CROSS-REFERENCE TO RELATED APPLICATIONS

This application is based upon and claims the benefit of priority from prior Japanese Patent Application No. 2010-083945, filed Mar. 31, 2010, the entire contents of which are incorporated herein by reference.

BACKGROUND OF THE INVENTION

1. Field of the Invention

This invention relates to an electronic apparatus, such as a disk drive suspension, comprising an electrical component, such as a microactuator.

2. Description of the Related Art

A hard disk drive (HDD) is used in an information processing apparatus, such as a personal computer. The HDD comprises a magnetic disk rotatable about a spindle, a carriage turnable about a pivot, etc. The carriage, which comprises an actuator arm, is configured to be turned transversely relative to tracks about the pivot by a positioning motor, such as a voice coil motor.

A suspension is mounted on the actuator arm. The suspension comprises a load beam and flexure superposed thereon. A slider, which constitutes a magnetic head, is mounted on a gimbal portion formed near the distal end of the flexure. The slider is provided with elements (transducers) for accessing data, that is, for reading or writing data.

In order to overcome the increase in the recording density of disks, the magnetic head needs to be more precisely positioned relative to the recording surface of each disk. To attain this, DSA suspensions, such as the ones disclosed in Jpn. Pat. Appln. KOKAI Publications Nos. 2001-307442 (Patent Document 1) and 2002-50140 (Patent Document 2), have been developed. One such DSA suspension combines a positioning motor (voice coil motor) and microactuator. DSA is an abbreviation of dual stage actuator.

The microactuator element comprises a piezoelectric element of, for example, lead zirconate titanate (PZT) or the like. An element accommodation portion is formed in an electrically conductive plate member that constitutes a part of the suspension. The microactuator element is located in the element accommodation portion. The microactuator element serves to move the distal end side of the suspension in a sway direction (or transversely relative to tracks) at high speed.

The piezoelectric element of the DSA suspension is plate-like. A first electrode is disposed on one thicknesswise surface of the piezoelectric element, and a second electrode on the other surface. The first electrode is electrically connected to the conductive plate member through a conductive resin, such as silver paste. The conductive resin comprises conductive filler particles, such as silver particles in a resin material.

The conductive resin is applied in an uncured state between the conductive plate member and microactuator element. This conductive resin is cured after the application. In some cases, however, electrical resistance between the conductive resin and conductive plate member cannot be reduced by simply applying and curing the conductive resin. When a continuity test is conducted in a hot humid atmosphere, in particular, the electrical resistance between the conductive resin and conductive plate member may increase, causing conduction failure between the conductive plate member and an electrical component (e.g., the microactuator element).

In order to improve electrical conduction between the conductive resin and conductive plate member, a proposal has been made to plate a part of the conductive plate member (on which the conductive resin is disposed) with gold. A gold plating (gold deposit) cannot be oxidized and can achieve good electrical conduction to the conductive resin. Since gold is an inert metal, however, its adhesion to the conductive resin is poor. Thus, the peel strength of the conductive resin may be reduced in gold-plated areas.

BRIEF SUMMARY OF THE INVENTION

This invention provides an electronic apparatus, in which an electrical component, such as a microactuator element, and an electrically conductive plate member are connected to each other through conductive resin, so that reliable electrical conduction can be achieved between the electrical component and the conductive plate member.

An electronic apparatus according to the present invention comprises a metallic, electrically conductive plate member comprising a current-carrying part, an electrical component comprising a conduction part electrically connected to the current-carrying part of the conductive plate member, a thin porous plating layer of thickness 100 nm or less comprising a large number of gold particles and formed on at least a surface of the current-carrying part of the conductive plate member, and a conductive resin member which is disposed in a region covering the current-carrying part of the conductive plate member and the conduction part of the electrical component and electrically connects the conductive plate member and the electrical component.

In an electronic apparatus, such as a disk drive suspension, comprising an electrical component, such as a microactuator element, according to this arrangement, good electrical conduction can be ensured between the conductive plate member and the conductive resin member, and the conductive resin member can be reliably secured to the conductive plate member. Thus, this electronic apparatus is configured so that reliable conduction can be achieved between the conductive plate member and electrical component.

In an aspect of the invention, the electronic apparatus further comprises a laser spot weld configured to secure the conductive plate member to another member, and the thin porous plating layer is formed in a region which covers the current-carrying part of the conductive plate member and the laser spot weld. Further, the thin porous plating layer may be formed on the entire outer surface of the conductive plate member. Alternatively, the thin porous plating layer may be partially formed on only that region of the outer surface of the conductive plate member which covers the current-carrying part.

An example of the electronic apparatus is a disk drive suspension comprising a microactuator. The suspension comprises a base section secured to an arm of a carriage of a disk drive, a load beam on which a slider of a magnetic head is disposed, and a microactuator mounting section disposed between the base section and the load beam.

The microactuator mounting section comprises a metallic, electrically conductive plate member comprising a current-carrying part, a microactuator element disposed on the conductive plate member and comprising a conduction part electrically connected to the current-carrying part, a thin porous plating layer of thickness 100 nm or less comprising a large number of gold particles and formed on at least a surface of the current-carrying part of the conductive plate member, and a conductive resin member which is disposed in a region covering the current-carrying part of the conductive plate member and the conduction part of the microactuator element and electrically connects the conductive plate member and the microactuator element.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A disk drive suspension according to a first embodiment of the present invention will now be described with reference to FIGS. 1 to 6.

Figure 1:
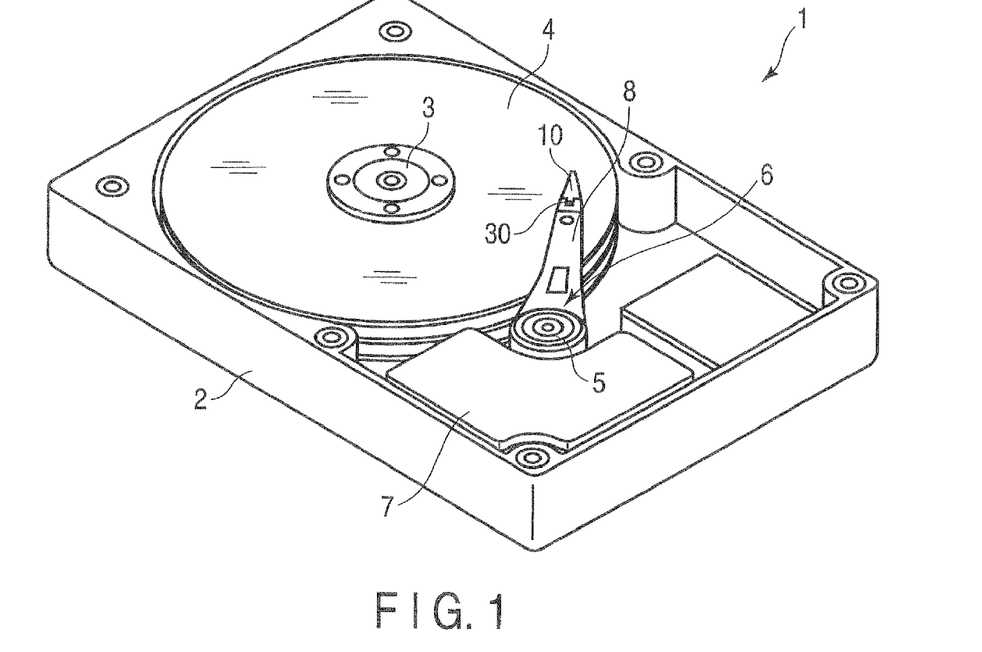
FIG. 1 is a perspective view showing an example of a disk drive.

A disk drive (HDD) 1 shown in FIG. 1 comprises a case 2, spindle 3, disks 4 rotatable about the spindle 3, carriage 6 turnable about a pivot 5, positioning motor (voice coil motor) 7 for actuating the carriage 6, etc. The case 2 is covered by a lid (not shown).

Figure 2:
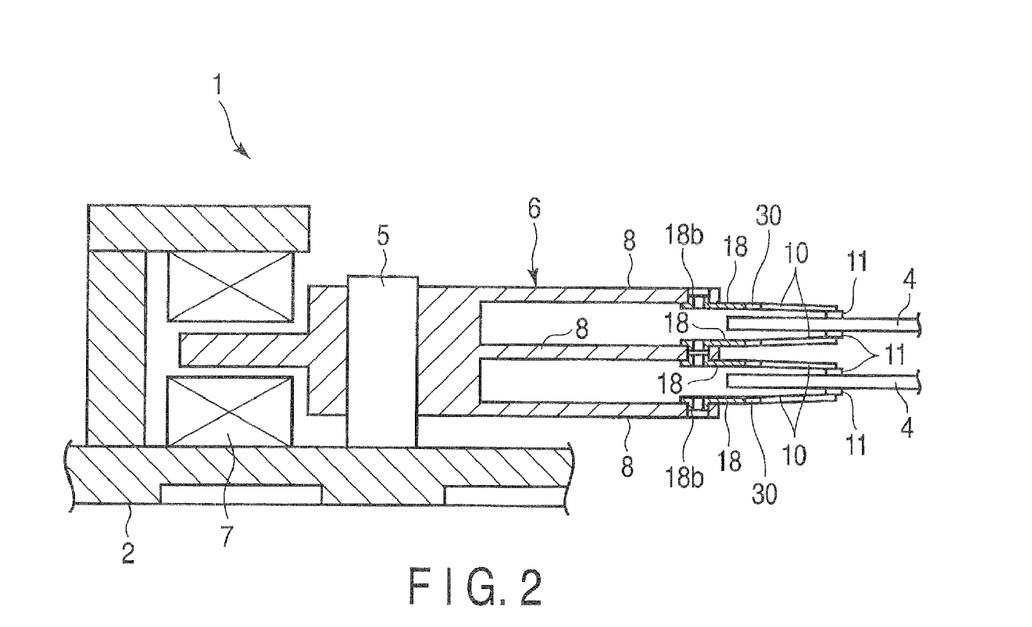
FIG. 2 is a sectional view of a part of the disk drive shown in FIG. 1.

FIG. 2 is a sectional view typically showing a part of the disk drive 1. As shown in FIG. 2, the carriage 6 comprises arms (carriage arms) 8. A suspension 10 is mounted on the distal end portion of each arm 8. A slider 11, which constitutes a magnetic head, is disposed on the distal end portion of the suspension 10. When each disk 4 is rotated at high speed, an air bearing is formed between the disk 4 and the slider 11.

If the carriage 6 is turned by the positioning motor 7, the suspension 10 moves radially relative to the disk 4. Thereupon, the slider 11 moves to a desired track of the disk 4. Elements, such as magnetoresistive elements (MR elements) capable of conversion between magnetic and electrical signals, are disposed on an end portion of the slider 11. These elements serve to write or read data to or from the disk 4.

Figure 3:
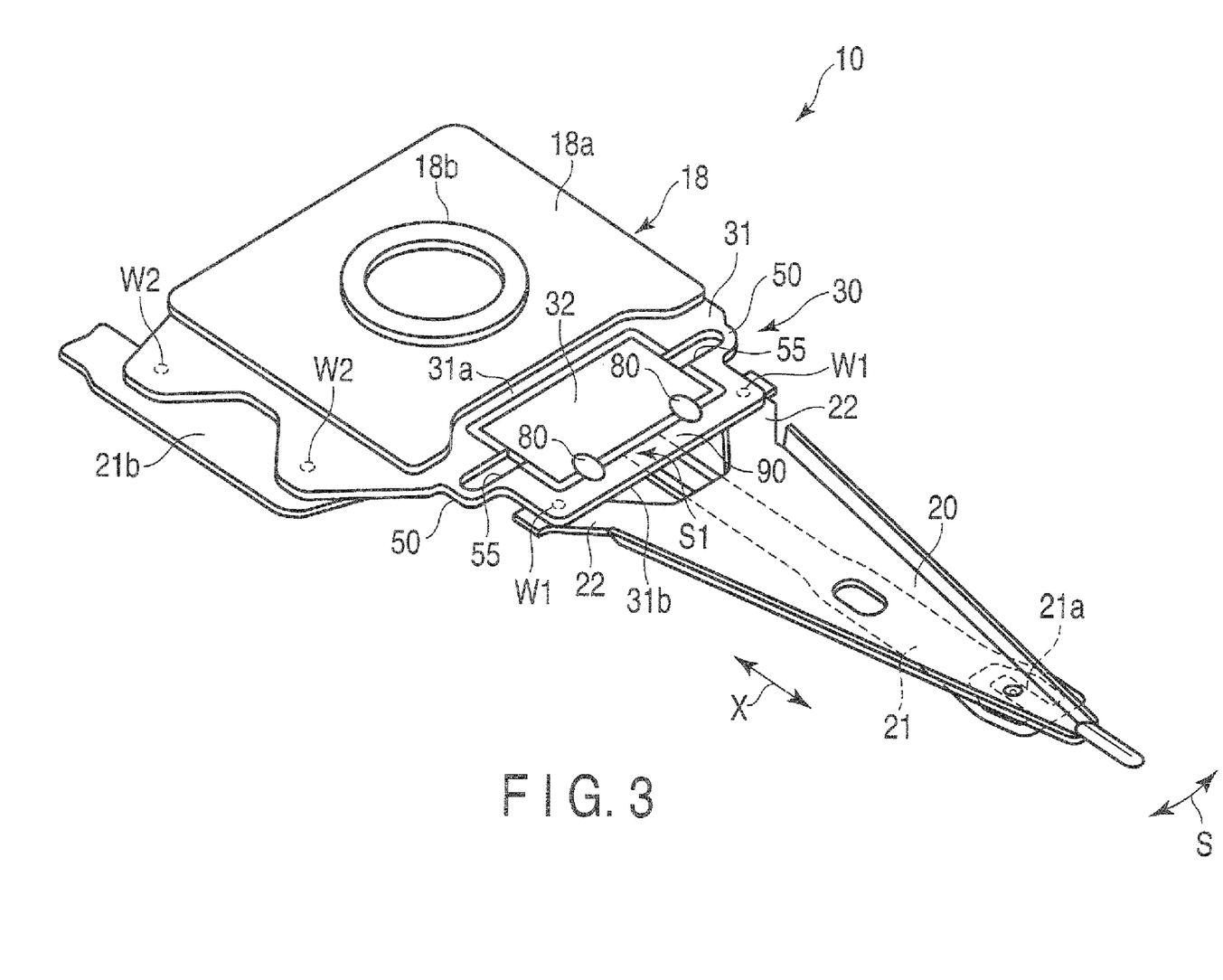
FIG. 3 is a perspective view of a suspension comprising a microactuator mounting section according to a first embodiment of the invention.

FIG. 3 shows the (DSA) suspension 10 as an example of the electronic apparatus. This suspension 10 comprises a base section 18 including a baseplate 18a, load beam 20, flexure 21 with conductors, microactuator mounting section 30, etc. The microactuator mounting section 30 will be described in detail later.

Figure 4:
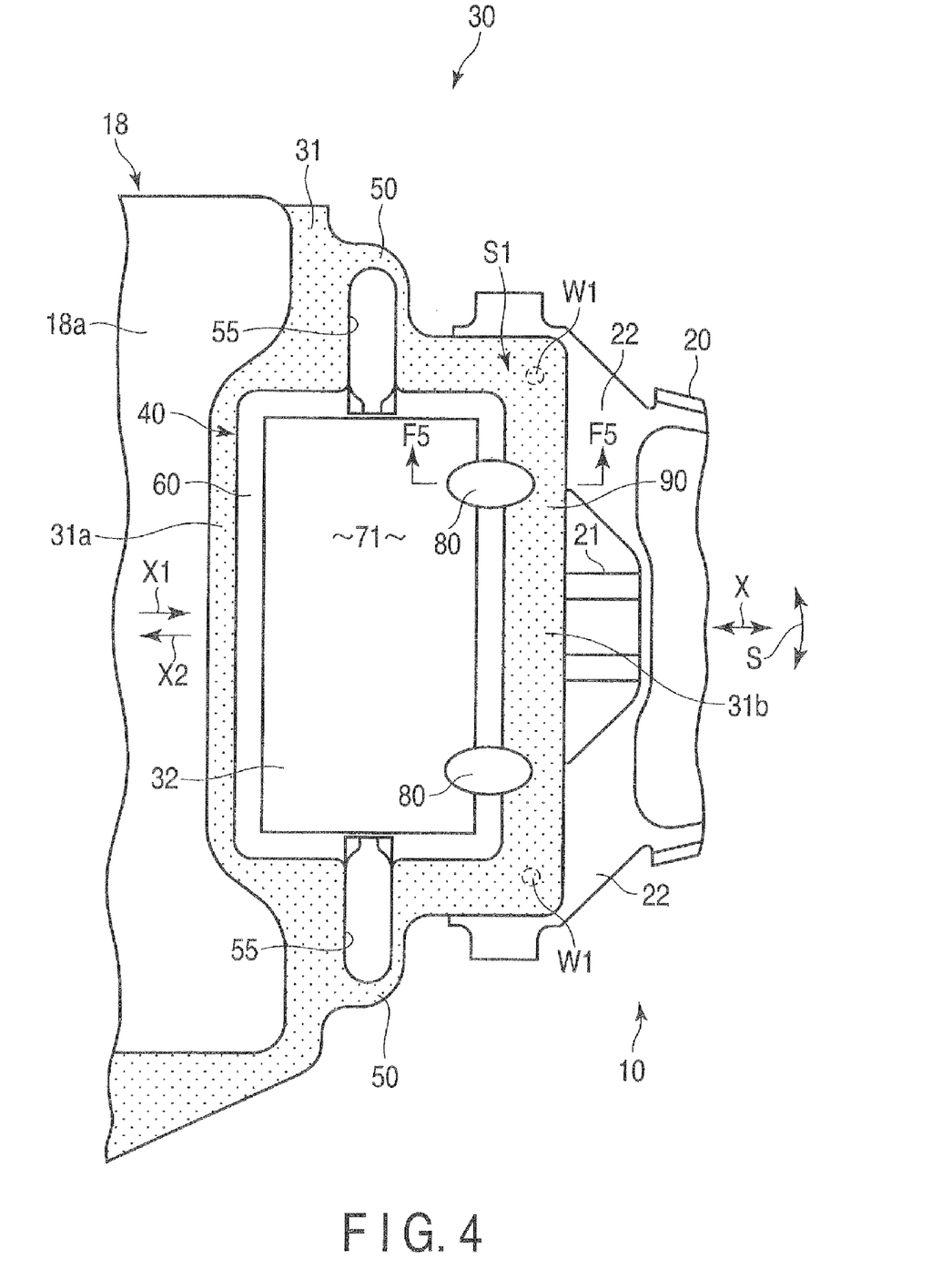
FIG. 4 is a plan view of the microactuator mounting section of the suspension shown in FIG. 3.

The load beam 20 is secured to its corresponding arm 8 (FIGS. 1 and 2) of the carriage 6 by the base section 18. Hinge portions 22 capable of thicknesswise elastic deformation are formed on the proximal portion (rear end portion) of the load beam 20. In FIGS. 3 and 4, arrow X indicates the longitudinal direction (front-rear direction) of the suspension 10 or that of the load beam 20, and arrow S indicates a sway direction.

The flexure 21 is located along the load beam 20. The flexure 21 is secured to the load beam 20 by fixing means, such as laser spot welding. A tongue 21a (FIG. 3) that functions as a gimbal portion is formed near the distal end of the flexure 21. The slider 11 is mounted on the tongue 21a. Thus, the magnetic head (or the slider 11) is disposed on the distal end portion of the load beam 20 by means of the tongue 21a. The load beam 20, flexure 21, slider 11, etc., constitute a head gimbal assembly.

FIG. 4 is an enlarged view of the microactuator mounting section 30. The mounting section 30 is located between the base section 18 and load beam 20. The mounting section 30 comprises an electrically conductive plate member 31, which constitutes a part of the suspension 10, and a microactuator element 32 as an example of the electrical component. The microactuator element 32 comprises a piezoelectric element, such as PZT.

The conductive plate member 31 consists mainly of austenite stainless steel, such as SUS304. The chemical composition of SUS304 is 0.08 or less carbon, 1.00 or less silicon, 2.00 or less manganese, 8.00 to 10.50 nickel, 18.00 to 20.00 chromium, and iron for the remainder.

In the present embodiment, the baseplate 18a and conductive plate member 31 are formed independently of each other, and the base section 18 is formed by superposing the baseplate 18a and conductive plate member 31 thicknesswise. A boss portion 18b is press-formed on the baseplate 18a.

The load beam 20 and conductive plate member 31 are secured to each other by laser spot welds W1 (partially shown in FIGS. 3 and 4). A plate-like metal base 21b, which is a part of the flexure 21, and the conductive plate member 31 are secured to each other by laser spot welds W2 (partially shown in FIG. 3). Welds W1 and W2 are formed by focusing laser beams by means of a laser welding device (not shown).

The conductive plate member 31 comprises a stationary part 31a and movable part 31b. The stationary part 31a is secured to the baseplate 18a. The movable part 31b is secured to the hinge portions 22 at the proximal portion (rear end portion) of the load beam 20. The conductive plate member 31 is formed with an element accommodation portion 40, which is a recess sufficiently large to accommodate the microactuator element 32. The element accommodation portion 40 is defined between the stationary and movable parts 31a and 31b of the conductive plate member 31. The microactuator element 32 is located in the element accommodation portion 40.

Arm portions 50 are formed individually on the opposite side portions of the conductive plate member 31. Slits 55 are defined inside the arm portions 50, individually. The movable part 31b of the conductive plate member 31 is movable relative to the stationary part 31a for a certain stroke in the sway direction (indicated by arrow S in FIGS. 3 and 4) by the arm portions 50.

The microactuator element 32 is shown as rectangular in the plan view of FIG. 4. An adhesive 60 is deposited on an outer peripheral portion of the microactuator element 32. The adhesive 60 consists mainly of an electrically insulating high molecular polymer material. The adhesive 60 is cured after it is introduced in a liquid state between the conductive plate member 31 and microactuator element 32. As a distortion of the microactuator element 32 produced when a potential is applied thereto is transmitted to the load beam 20, the load beam 20 can move in the sway direction.

Figure 5:
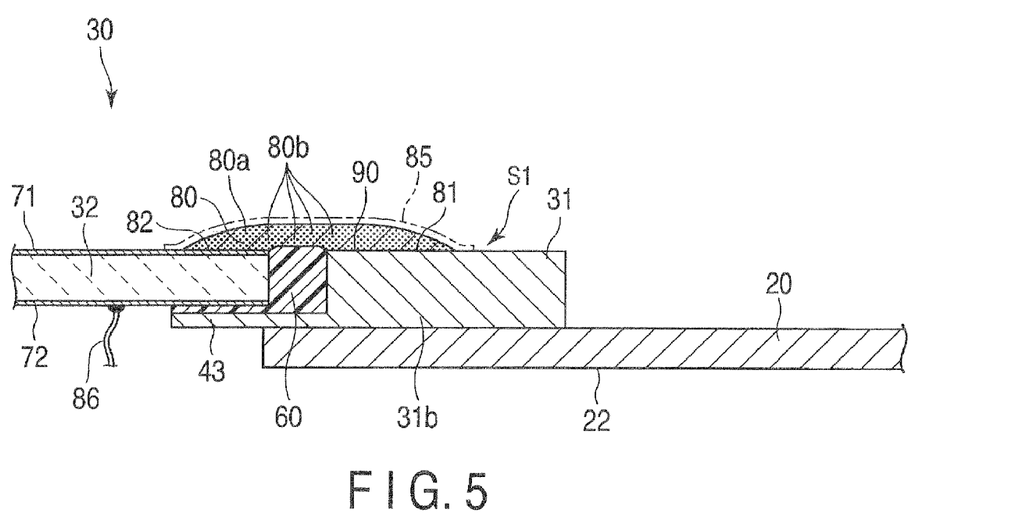
FIG. 5 is a sectional view of the microactuator mounting section taken along line F5-F5 of FIG. 4.

As shown in FIG. 5, a first electrode 71 is provided on one thicknesswise surface (upper surface in FIG. 5) of the plate-like microactuator element 32, and a second electrode 72 on the other surface (lower surface in FIG. 5). These electrodes 71 and 72 are formed individually on the opposite surfaces of the microactuator element 32 by sputtering or plating.

The first electrode 71 is electrically connected to the conductive plate member 31 through conductive resin members 80. Each conductive resin member (resin bead) 80 is disposed in a region that covers a current-carrying part 81 of the conductive plate member 31 and a conduction part 82 of the microactuator element 32. Silver paste is an example of the conductive resin member 80.

The silver paste contains a resin material 80*a* and a large number of conductive filler particles 80*b* mixed therein. The filler particles 80*b* may be silver particles, for example. Each uncured conductive resin member 80 is introduced to the current-carrying part 81 of the conductive plate member 31 and the conduction part 82 of the microactuator element 32. As the resin material 80*a* is cured, the conductive resin member 80 is secured to the current-carrying part 81 and conduction part 82. The conductive resin member 80 may be covered by a cover layer 85 (indicated by a two-dot chain line in FIG. 5). The cover member 85 consists mainly of, for example, a photosetting resin (high molecular polymer material). The cover layer 85 entirely covers the conductive resin member 80 to protect it.

As shown in FIG. 5, the second electrode 72 of the microactuator element 32 is connected to a circuit portion (not shown) of the flexure 21 with conductors by a bonding wire 86. An example of the circuit portion is a conductor attached to the flexure 21. Alternatively, however, some other suitable conductor may be used for this purpose.

A thin porous plating layer 90 of thickness 100 nm or less is formed on the entire outer surface of the conductive plate member 31. The thin porous plating layer 90 may also be called a flash. In FIG. 4, the thin porous plating layer 90 is represented by a scattered-dot pattern for the sake of convenience. The thin porous plating layer 90 is so thin that it is indicated by a full line shared with the contour of the conductive plate member 31 in FIG. 5.

Figure 6:
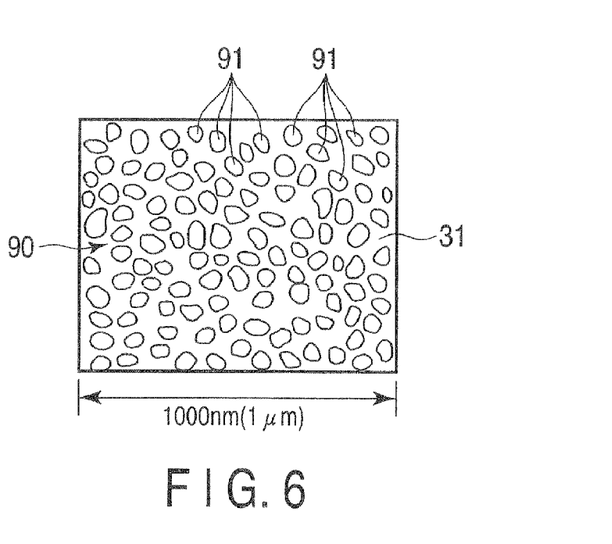
FIG. 6 is an enlarged view showing gold particles thin porous plating layer on a conductive plate member of the suspension shown in FIG. 3.

FIG. 6 is an enlarged view of the thin porous plating layer 90 based on a 50,000× electron micrograph. As shown in FIG. 6, the thin porous plating layer 90 comprises a large number of dispersed insular gold particles 91 adhering to the surface of the conductive plate member 31. Those parts of the surface of the conductive plate member 31 to which the gold particles 91 adhere are covered by the gold particles. That surface part of the conductive plate member 31 free from adhesion of the gold particles 91 is exposed.

The very thin porous plating layer 90 of nano-order thickness does not produce the color (lemon yellow) peculiar to gold. Apparently, therefore, the conductive plate member 31 covered by the thin porous plating layer 90 displays the color of the ground metal (stainless steel) of the conductive plate member 31.

The thin porous plating layer 90 is formed in region S1 shown in FIGS. 4 and 5. Region S1 covers the laser spot welds W1 and the current-carrying part 81 of the conductive plate member 31. Specifically, according to this embodiment, the thin porous plating layer 90 is formed on the entire outer surface of the conductive plate member 31. Thus, the plating process does not require masking, such as the one required by partial plating, so that it can be made simpler.

The thin porous plating layer 90 may be locally formed on that region of the outer surface of the conductive plate member 31 which covers the current-carrying part 81 by partial plating. Since the partial plating requires masking, so that the number of necessary steps is increased as compared with the overall plating. However, the use of gold can be reduced compared with the overall plating that is the case where the thin porous plating layer 90 is formed on the entire conductive plate member 31.

In order to form the thin porous plating layer 90 on the surface of the conductive plate member 31, the surface of the conductive plate member 31 is first chemically polished with an etchant. Thereafter, the surface of the conductive plate member 31 is electroplated with a gold plating liquid for a predetermined time (e.g., tens of seconds). By this electroplating, the insular gold particles 91 are dispersedly deposited on the surface of the conductive plate member 31. The thin porous plating layer 90 of, for example, 20-nm thickness is formed in this way. The size of gold particles 91 can be adjusted according to the composition of the gold plating liquid. The thickness of the thin porous plating layer 90 preferably ranges from 2 to 100 nm. These values of the thickness of the thin porous plating layer 90 are based on, for example, a measured value (average film thickness with 0.1-mm aperture diameter) of a fluorescent X-ray film thickness gauge that is normally used in the art.

Gold is an inert metal. If the surface of the conductive plate member 31 is plated with gold to a normal thickness (100 nm or more), therefore, the entire surface of the conductive plate member 31 is inevitably covered with gold. In such a case, the conductive resin members 80 cannot easily adhere to the gold-plated area, so that their peel strength may be insufficient. If the conductive resin members 80 are arranged on the conductive plate member 31 without gold plating, however, electrical conduction between the conductive plate member 31 and conductive resin members 80 becomes inappropriate. When a continuity test is conducted in a hot humid atmosphere, in particular, conduction failure may occur between the conductive plate member 31 and microactuator element 32.

In the microactuator mounting section 30 of the present embodiment, in contrast, the insular gold particles 91 of the thin porous plating layer 90 dispersedly adhere to the surface of the conductive plate member 31. Since the conductive resin members 80 are applied from above these gold particles 91 and cured, their adherent to conductive plate member 31 can be improved. Thus, the strength of adherence of the conductive resin members 80 to the conductive plate member 31 can be increased by a so-called anchor effect.

If a gold plating of a normal thickness is formed in a region to be subjected to laser spot welding, the entire surface of the conductive plate member 31 is covered with gold and hence becomes a substantially light-reflective surface. Thus, a laser beam emitted toward the conductive plate member 31 is inevitably reflected by the gold plating (gilding). In this case, the laser beam cannot be easily irradiate on the conductive plate member 31, whereby welding failure occurs.

According to the present embodiment, in contrast, the ground metal of the conductive plate member 31 is microscopically exposed in those parts of the surface of the conductive plate member 31 which are not covered by the gold particles 91. Therefore, the reflectance of the laser beam emitted toward the conductive plate member 31 can be reduced. In other words, the laser beam can be effectively irradiated on the weld spots of the conductive plate member 31. Thus, even though the thin porous plating layer 90 is formed on the entire outer surface of the conductive plate member 31, satisfactory welds W1 and W2 can be formed without welding failure.

Continuity tests on conductive resin members were conducted in a hot humid atmosphere for the conductive plate member of the present embodiment and conductive plate members of Comparative Examples 1 and 2, individually. The conductive plate member of the present embodiment comprises the thin porous plating layer 90 (70 nm thick). The conductive plate member of Comparative Example 1 is not provided with any gold plating. The conductive plate member of Comparative Example 2 is partially plated with gold to a thickness of 1 μm or more. The electrical resistance (Ω) after 500 hours was measured in an atmosphere having a temperature of 85° C. and relative humidity of 85% as test conditions.

The conductive plate member of the present embodiment displayed stable conduction properties, that is, pre- and post-test averages of 0.4 and 2.2Ω, respectively. In contrast, the conductive plate member of Comparative Example 1, which is not plated with gold, displayed a huge post-test average of $2.2 \times 10^6 \Omega$ as well as a high pre-test average of 49.2Ω. The conductive plate member of Comparative Example 2, which is plated with gold to the normal thickness, displayed high conduction properties, that is, pre- and post-test averages of 0.8 and 1.1Ω, respectively. Thus, the conductive plate member of the present embodiment proved to compete in conduction performance with the conductive plate member (Comparative Example 2) partially plated with gold to the normal thickness.

As regards the bond strength of the conductive resin members 80, the (share-mode) peel strength of Comparative Example 1 was found to be 268.2 gf (2.628 N) on average. In contrast, the peel strength of the conductive plate member of the present embodiment proved to be 277.6 gf (2.72 N) on average. The thin porous plating layer 90 of the present embodiment is 70 nm thick. The conductive plate member of the present embodiment proved to be equivalent in peel strength to that of Comparative Example 1. For these reasons, the microactuator mounting section 30 of the present embodiment was able to reliably display high durability without conduction failure between the conductive plate member 31 and microactuator element 32 even in the hot humid atmosphere.

The following is a description of the operation of the suspension 10.

If the carriage 6 is turned by the positioning motor 7, the suspension 10 moves radially relative to each disk 4. Thereupon, the slider 11 of the magnetic head moves to a desired track of the disk 4.

The first electrode 71 of the microactuator element 32 is connected to a first terminal of a drive circuit through the conductive resin members 80 and conductive plate member 31. The second electrode 72 is connected to a second terminal of the drive circuit by the bonding wire 86. A potential produced by the drive circuit is applied to the microactuator element 32 through the electrodes 71 and 72.

On application of the potential, the microactuator element 32 is distorted according to the magnitude of the potential. Thereupon, the load beam 20 can be finely moved in the sway direction (indicated by arrow S in FIGS. 3 and 4). Thus, the slider 11 can be positioned quickly and accurately in the sway direction.

Figure 7:
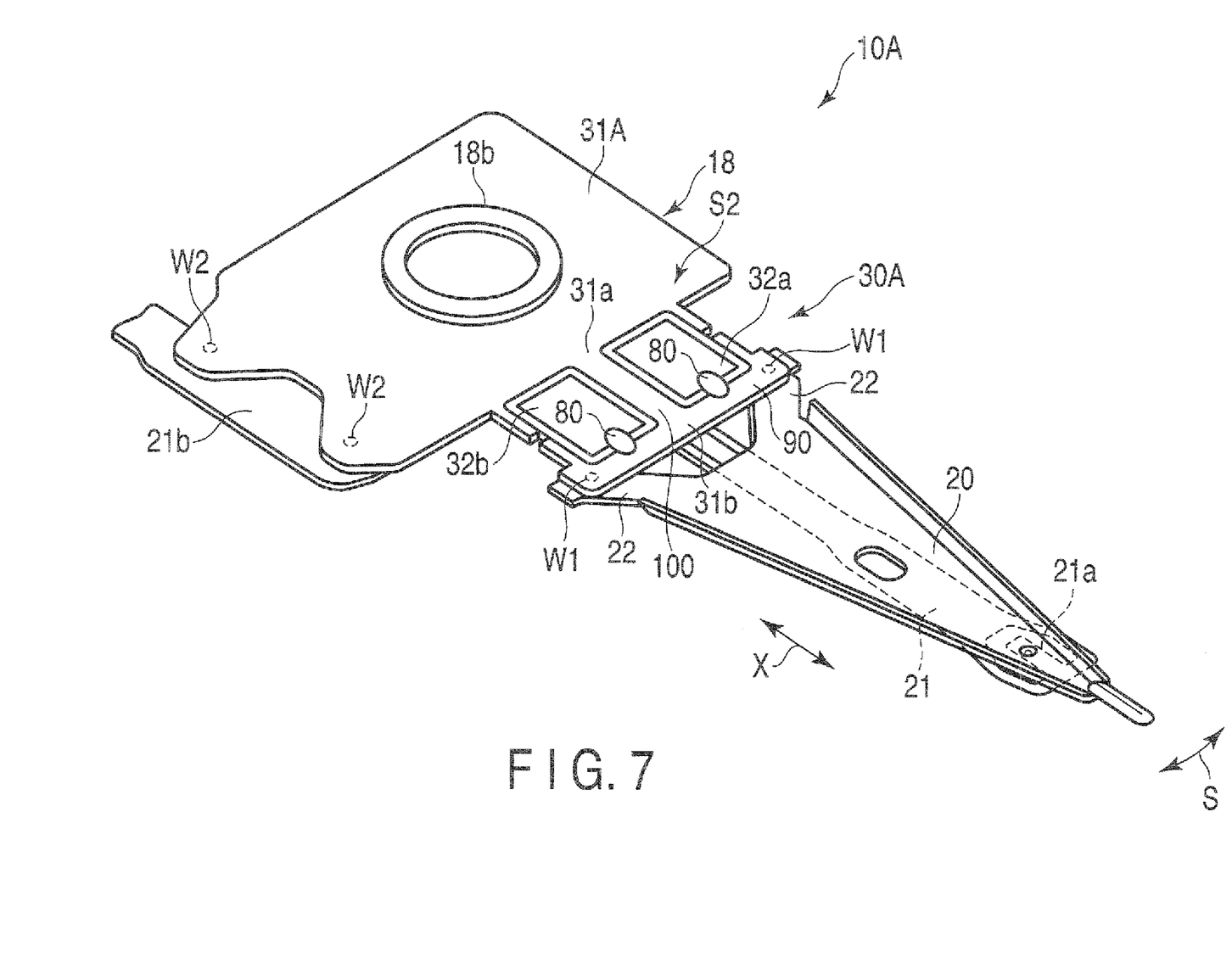
FIG. 7 is a perspective view of a suspension comprising a microactuator mounting section according to a second embodiment of the invention.

FIG. 7 shows a suspension 10A with a microactuator mounting section 30A according to a second embodiment. The mounting section 30A comprises a pair of microactuator elements 32a and 32b. An extended portion 100 is formed on a conductive plate member 31A that also serves as a baseplate. A movable part 31b is disposed on the distal end of the extended portion 100. The microactuator elements 32a and 32b are arranged parallel to each other between a stationary part 31a and the movable part 31b of the conductive plate member 31A.

In this suspension 10A, a boss portion 18b is formed by pressing the conductive plate member 31A that doubles as the baseplate. The boss portion 18b is secured to its corresponding arm 8 of the carriage 6 of the disk drive 1 (FIGS. 1 and 2). A thin porous gold plating layer 90 is formed on the entire outer surface of the conductive plate member 31A. The outer surface of the conductive plate member 31A includes region S2 in which the conductive resin members 80 are arranged. The thin porous gold plating layer 90 on the conductive plate member 31A, like the one on the microactuator mounting section 30 of the first embodiment, comprises a plurality of gold particles 91 (FIG. 6).

The boss portion 18b is press-formed on the conductive plate member 31A. In this case, the conductive plate member 31A is handled as a single part during the press-forming operation. Thus, it is difficult to subject the conductive plate member 31A partial plating that requires masking. In the second embodiment, therefore, the thin porous plating layer 90 is formed on the entire outer surface of the conductive plate member 31A. If this is done, the conductive plate member 31A need not be masked, so that the thin porous plating layer 90 can be formed in a simple process.

According to the second embodiment described above, the thin porous plating layer 90 is formed on the entire outer surface of the conductive plate member 31A, that is, overall plating. Overall plating covers a much wider area than partial plating. However, the thin porous plating layer 90 is very thin, ranging from 2 to 100 nm. Even if the conductive plate member 31A is plated all over with gold, therefore, the amount of gold used is not much larger than in the case of conventional partial plating for an ordinary thickness (1 μm or more). In the case where the conductive plate member 31A is plated all over, the plating process does not require masking and can hence be made simpler than in the case of partial plating, so that it can be achieved at a relatively low cost.

In the suspension 10A comprising the microactuator mounting section 30A, the microactuator elements 32a and 32b are deformed in the opposite directions according to the magnitude of a potential applied thereto. Thereupon, a load beam 20 can be moved in a sway direction (indicated by arrow S in FIG. 7). The load beam 20 moves in the sway direction as the one microactuator element 32a extends and the other element. 32b contracts. Since other configurations and effects are common to the microactuator mounting section 30 of the first embodiment (FIGS. 1 to 5) and the microactuator mounting section 30A of the second embodiment (FIG. 7), common numbers are used to designate common portions, and a description of those portions is omitted.

In connection with each of the embodiments described herein, the disk drive suspension comprising a microactuator has been described as an example of the electronic apparatus comprising an electrical component. It is to be understood, in carrying out the present invention, however, that the specific forms of the conductive plate member, conductive resin members, thin porous plating layer, etc., as well as of the electronic apparatus comprising an electrical component, may be modified variously.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
a metallic, electrically conductive plate member comprising a current-carrying part;
an electrical component comprising a conduction part electrically connected to the current-carrying part of the conductive plate member;
a thin porous plating layer of thickness 100 nm or less comprising a large number of gold particles and formed on at least a surface of the current-carrying part of the conductive plate member; and
a conductive resin member which is disposed in a region covering the current-carrying part of the conductive plate member and the conduction part of the electrical component and electrically connects the conductive plate member and the electrical component.

2. The electronic apparatus of claim 1, further comprising a laser spot weld configured to secure the conductive plate member to another member, wherein the thin porous plating layer is formed in a region which covers the current-carrying part of the conductive plate member and the laser spot weld.

3. The electronic apparatus of claim 2, wherein the thin porous plating layer is formed on the entire outer surface of the conductive plate member.

4. The electronic apparatus of claim 1, wherein the thin porous plating layer is partially formed on only that region of the outer surface of the conductive plate member which covers the current-carrying part.

5. A disk drive suspension comprising:
a base section secured to an arm of a carriage of a disk drive;
a load beam on which a magnetic head is disposed; and
a microactuator mounting section disposed between the base section and the load beam,
the microactuator mounting section comprising
a metallic, electrically conductive plate member comprising a current-carrying part,
a microactuator element disposed on the conductive plate member and comprising a conduction part electrically connected to the current-carrying part,
a thin porous plating layer of thickness 100 nm or less comprising a large number of gold particles and formed on at least a surface of the current-carrying part of the conductive plate member, and
a conductive resin member which is disposed in a region covering the current-carrying part of the conductive plate member and the conduction part of the microactuator element and electrically connects the conductive plate member and the microactuator element.

6. The disk drive suspension of claim 5, further comprising a laser spot weld configured to secure the conductive plate member to the load beam, wherein the thin porous plating layer is formed in a region which covers the current-carrying part of the conductive plate member and the laser spot weld.

7. The disk drive suspension of claim 6, wherein the thin porous plating layer is formed on the entire outer surface of the conductive plate member.

8. The disk drive suspension of claim 5, wherein the thin porous plating layer is partially formed on only that region of the outer surface of the conductive plate member which covers the current-carrying part.

* * * * *